United States Patent
Yoon et al.

(10) Patent No.: US 10,585,602 B2
(45) Date of Patent: Mar. 10, 2020

(54) SMART MEMORY BUFFERS

(71) Applicant: Hewlett Packard Enterprise Development LP, Houston, TX (US)

(72) Inventors: Doe Hyun Yoon, San Jose, CA (US); Naveen Muralimanohar, Santa Clara, CA (US); Jichuan Chang, Sunnyvale, CA (US); Parthasarathy Ranganathan, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 80 days.

(21) Appl. No.: 16/011,187

(22) Filed: Jun. 18, 2018

(65) Prior Publication Data
US 2018/0307420 A1    Oct. 25, 2018

Related U.S. Application Data

(62) Division of application No. 14/417,220, filed as application No. PCT/US2012/062600 on Oct. 30, 2012, now Pat. No. 10,019,176.

(51) Int. Cl.
*G06F 12/00* (2006.01)
*G06F 3/06* (2006.01)
*G06F 11/10* (2006.01)

(52) U.S. Cl.
CPC ............ *G06F 3/0619* (2013.01); *G06F 3/065* (2013.01); *G06F 3/0655* (2013.01); *G06F 3/0665* (2013.01); *G06F 3/0688* (2013.01); *G06F 11/108* (2013.01); *G06F 3/0656* (2013.01);
(Continued)

(58) Field of Classification Search
CPC .... G06F 3/0619; G06F 11/108; G06F 3/0665; G06F 3/0688; G06F 2211/1054; G06F 2211/1066; G06F 3/0689
See application file for complete search history.

(56) References Cited

U.S. PATENT DOCUMENTS

| | | |
|---|---|---|
| 5,488,731 A | 1/1996 | Mendelsohn |
| 5,550,986 A | 8/1996 | DuLac |
| 5,594,862 A | 1/1997 | Wnkler et al. |

(Continued)

FOREIGN PATENT DOCUMENTS

| | | |
|---|---|---|
| EP | 0768607 A2 | 4/1997 |
| WO | WO-2004046971 A1 | 6/2004 |

OTHER PUBLICATIONS

Chhabra et al., "I-NVMM: a secure non-volatile main memory system with incremental encryption", Proceedings of the 38th annual international symposium on Computer architecture, 2011, 12 pages.

(Continued)

*Primary Examiner* — Arvind Talukdar

(57) ABSTRACT

An example method involves receiving, at a first memory node, data to be written at a memory location in the first memory node. The data is received from a device. At the first memory node, old data is read from the memory location, without sending the old data to the device. The data is written to the memory location. The data and the old data are sent from the first memory node to a second memory node to store parity information in the second memory node without the device determining the parity information. The parity information is based on the data stored in the first memory node.

15 Claims, 10 Drawing Sheets

(52) U.S. Cl.
CPC .... *G06F 3/0689* (2013.01); *G06F 2211/1054* (2013.01); *G06F 2211/1066* (2013.01)

(56) References Cited

U.S. PATENT DOCUMENTS

| | | | |
|---|---|---|---|
| 5,742,752 | A | 4/1998 | DeKoning et al. |
| 5,982,890 | A | 11/1999 | Akatsu |
| 6,374,337 | B1 * | 4/2002 | Estakhri .............. G11C 8/00 365/189.05 |
| 7,584,335 | B2 | 9/2009 | Daniels |
| 7,716,411 | B2 | 5/2010 | Panabaker et al. |
| 8,060,692 | B2 | 11/2011 | Christenson et al. |
| 2002/0095568 | A1 | 7/2002 | Norris |
| 2003/0033572 | A1 | 2/2003 | Walton et al. |
| 2003/0188097 | A1 | 10/2003 | Holland et al. |
| 2008/0250270 | A1 * | 10/2008 | Bennett ............ G06F 11/1068 714/6.13 |
| 2010/0082890 | A1 | 4/2010 | Heo et al. |
| 2010/0110748 | A1 | 5/2010 | Best |
| 2011/0161748 | A1 | 6/2011 | Casper et al. |
| 2011/0202721 | A1 | 8/2011 | Popovski et al. |
| 2011/0208995 | A1 | 8/2011 | Hafner |
| 2011/0238885 | A1 | 9/2011 | Kitahara et al. |

OTHER PUBLICATIONS

Dhiman et al., "PDRAM: A hybrid PRAM and DRAM main memory system", Proceedings of the 46th Annual Design Automation Conference, 2009, 6 pages.
Qureshi et al., "Scalable High-Performance Main Memory System Using Phase-Change Memory Technology", Proceedings of the 36th annual international symposium on Computer architecture, 2009, 10 pages.
Ramos et al., "Page Placement in Hybrid Memory Systems", Proceedings of the international conference on Supercomputing, 2011, 11 pages.
Supplementary European Search Report and Search Opinion Received for EP Application No. 128875945, dated Jun. 6, 2016, 7 pages.
Supplementary European Search Report and Search Opinion Received for EP Application No. 12887594.5, dated Oct. 5, 2016, 12 pages.
Udipi et al., "Combining Memory and a Controller with Photonics through 3D stacking to Enable Scalable and Energy-Efficient Systems", Proceedings of the 38th annual international symposium on Computer architecture, 2011, pp. 425-436.
PCT Search Report/Written Opinion—Serial No. PCT/US2012/062600 dated Jul. 24, 2013—pp. 14.

* cited by examiner

RAID DATA ORGANIZATION
($P = A \oplus B \oplus C \oplus D$)

(PRIOR ART WRITE PROCESS)

EXAMPLE FORWARDED WRITE PROCESS

DIRECT MEMORY-TO-MEMORY TRANSFER PROCESS

DRAM CACHE AND PROCESS FOR ITS USE

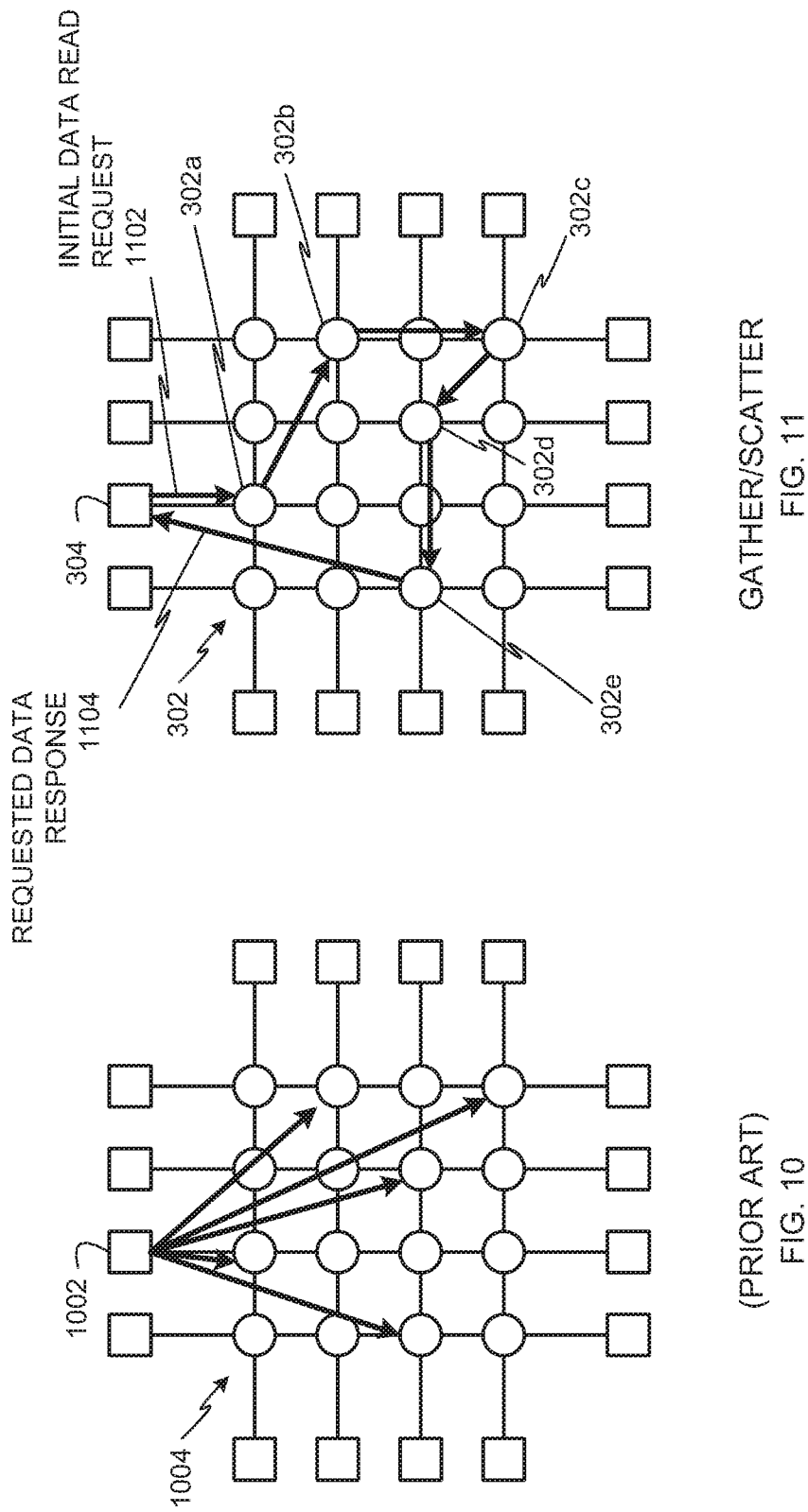

SMART MEMORY BUFFERS

STATEMENT OF GOVERNMENT INTEREST

An invention disclosed herein has been made with government support under Contract No. DE-SC0005026, awarded by The Department of Energy. The government has certain rights in the invention.

BACKGROUND

Some computing systems use random access memory (RAM) devices as intermediary storage for relatively fast access to data that is also stored in long-term electro-mechanical or electro-optical mass storage devices (e.g., magnetic memories, optical memories, etc.). In this manner, computing systems can perform faster data accesses by copying data from the long-term mass storage devices to the intermediary RAM devices, and accessing the data from the RAM devices.

Long-term solid-state memory devices include non-volatile random access memory (NVRAM) such as phase-change ram (PCRAM), Memristors, and spin-transfer torque random access memory (STT-RAM). An advantage of NVRAM devices over traditional dynamic random access memory (DRAM) is that NVRAM devices can provide higher densities than traditional DRAM on a given integrated circuit (IC) die space. However, some NVRAM devices lack the fast access speeds available on DRAM devices.

BRIEF DESCRIPTION OF THE DRAWINGS

FIG. 10 is a prior art manner of reading data distributed across several memory nodes in a RAID organization.

FIG. 11 is an example gather/scatter process for reading/writing data distributed across several memory nodes in the RAID organization of FIG. 3 in accordance with the teachings of this disclosure.

DETAILED DESCRIPTION

Figure 1A:
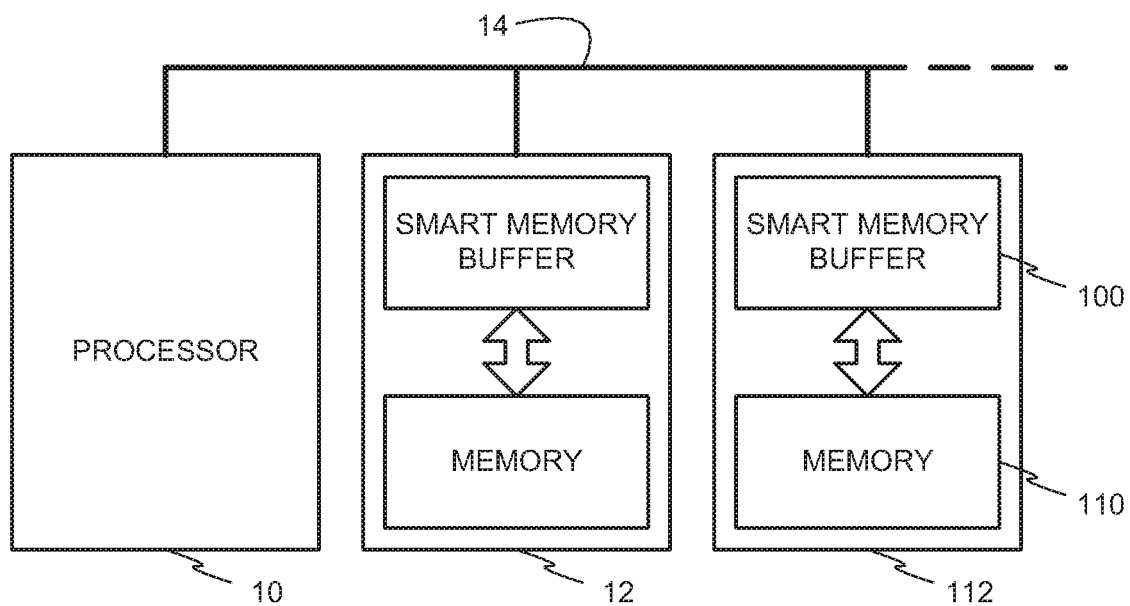
FIG. 1A is an example memory system having smart memory buffers implemented in accordance with the teachings of this disclosure.

Example methods, apparatus, and articles of manufacture disclosed herein may be used to implement memory systems using smart memory buffers. Disclosed examples may be used to implement smart memory buffers in memory modules having integrated circuit (IC) or solid state memories. Such memories may be volatile memories such as dynamic random access memory (DRAM) devices or static random access memory devices, and/or non-volatile memories such as flash devices, Memristor devices, etc. Disclosed example smart memory buffers include a memory controller and intelligent functionality to enable memory modules to perform processes in an autonomous manner without requiring the relatively higher levels of intervention by external processors or devices (e.g., memory controllers) required by prior memory systems. In this manner, disclosed example smart memory buffers enable performing memory operations more efficiently by requiring less external communications with processors and/or memory controllers than in prior memory systems.

Disclosed example smart memory buffers have external communication interfaces that are standardized to communicate with other memory modules, processors (e.g., hardware processors), and/or memory controllers (e.g., hardware memory controllers), and that abstract those external communications from the more complex memory technology-specific interfaces used for internal communications (e.g., intra-memory-module communications) between the smart memory buffers and corresponding memory ICs co-located on the same board or chip. In this manner, external interfaces provided by smart memory buffers disclosed herein reduce the complexities of interfacing memory modules with one another and/or with external devices (e.g., processors and/or memory controllers) that read and/or write data in the memory modules.

In prior systems that use IC or solid state memories, processors and/or controllers external from the solid state memories are involved in multiple operations to cause the solid state memories to perform complex processes. For example, when storing data in a parity-based memory system, a processor or controller of a prior system issues multiple commands to a solid state memory to, for example, read old data, write new data, read old parity information, determine new parity information, and/or write the new parity information. Example smart buffers disclosed herein are configured to decrease the amount of bus communications required from an external processor and/or memory controller when requesting data to be read, written, and/or modified in one or more solid state memory modules.

Smart memory buffers disclosed herein are provided in memory modules having solid state memory devices. The example smart memory buffers perform complex memory access and/or memory management operations with no involvement from external processors and/or memory controllers, and/or with relatively less involvement from external processors and/or memory controllers than required by prior systems. For example, in a memory module that implements parity, a disclosed smart memory buffer may receive a single request or command from a processor to write data at a memory location in the memory module. The disclosed smart memory buffer performs further operations (e.g., reading old data and old parity information, and determining new parity information) to write the data and new parity information in the memory module without needing further involvement from the requesting processor. In addition, disclosed smart memory buffers enable implementing redundant array of independent disks (RAID) configurations using solid state memory modules in communication with one another. Disclosed smart memory buffers of the solid state memory modules communicate with one another via the same external bus to store data and parity in a distributed manner across the solid state memory modules in accordance with one or more RAID standards.

Figure 1B:
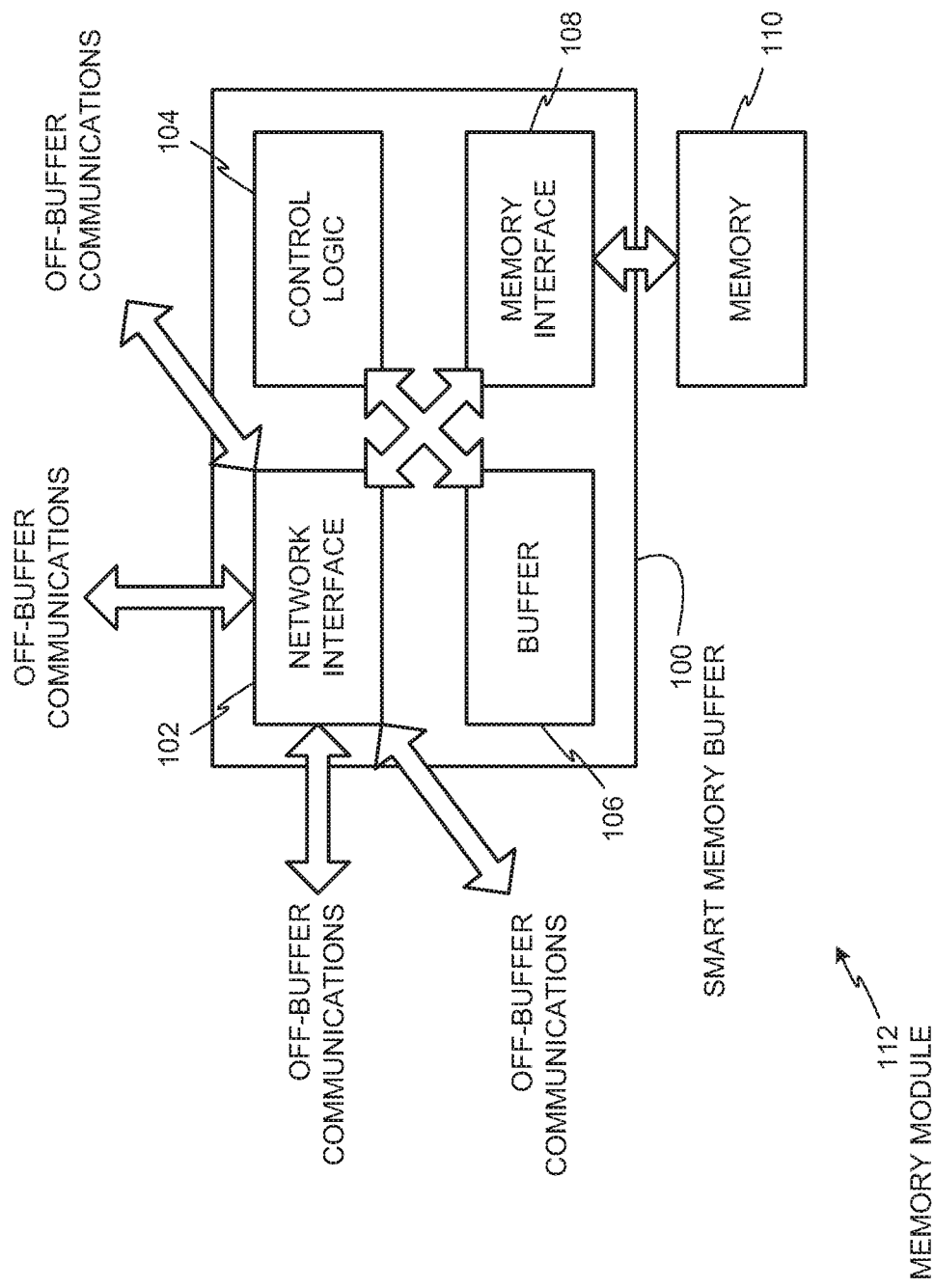
FIG. 1B is a detailed block diagram of a smart memory buffer.

Memory modules are also referred to herein as memory nodes. In some examples, when a plurality of memory modules are in communication with one another via a shared bus, the memory modules are referred to as memory nodes of a memory system. As such, like a memory module, a memory node includes one or more solid state memory device(s) and a corresponding smart buffer IC that performs data access and/or management operations on the one or more solid state memory device(s). An example memory module or memory node implemented in accordance with the teachings of this disclosure is shown in FIGS. 1A and 1B, and is described in detail below.

Disclosed example methods to write data in a memory node involve receiving, at a first memory node, data to be written at a memory location in the first memory node. In some such examples, the data is received from a requesting device. At the first memory node, old data is read from the memory location, without sending the old data to the requesting device. In some such examples, the data is then written to the memory location, and the data and the old data are sent from the first memory node to a second memory node to store parity information in the second memory node without needing the requesting device to determine the parity information. In some such examples, the parity information is based on the data stored in the first memory node. In some examples, the second memory node performs an EXCLUSIVE-OR (XOR) operation on at least the data and the old data to generate the parity information. In other examples, instead of sending the data and the old data from the first memory node to the second memory node, the first memory node performs an XOR operation on the data and the old data, and the first memory node sends the result of the XOR operation to the second memory node to store the parity information in the second memory node. In some example methods, after receiving the data at the first memory node, further communications with the requesting device are not required to write the data in the memory location, nor are further communications with the requesting device required to send the data and the old data (or the XOR result of the data and the old data) from the first memory node to the second memory node.

In some examples, the requesting device is a processor, and the first memory node is in communication with the processor and the second memory node via a network interface. In some examples, the requesting device is a third memory node in network communication with the first memory device, and the data is forwarded data sourced by a processor in communication with the third memory node.

In some examples, the disclosed example methods further comprise, in response to a node-to-node copy request, sending the data stored at the memory location of the first memory node from the first memory node to a third memory node for writing to the third memory node. In some such examples, the disclosed example methods further comprise receiving the node-to-node copy request at the first memory node from the requesting device or another requesting device external from the first memory node. In other such examples, the node-to-node copy request is an automatic event generated at the first memory node without intervention from an external device (e.g., the requesting device).

Disclosed example apparatus to store data in a networked memory organization, include a plurality of DRAM modules (or other types of solid state memory modules). The DRAM modules of some such examples include network interfaces to communicatively couple the DRAM modules with one another (e.g., via a shared external bus), and to communicatively couple at least some of the DRAM modules to one or more processors (and/or memory controllers) to allow the processors to access data stored in any of the DRAM modules. The DRAM modules of some such examples also include logic circuits to generate parity information to store in a distributed arrangement across the plurality of dynamic random access memory modules. In some examples, the data and the parity is stored across the dynamic random access memory modules in a striped arrangement (e.g., in accordance with a RAID storage arrangement). In some examples, the dynamic random access memory modules are mounted on a single printed circuit board (PCB).

Disclosed example apparatus to read data include at least one processor, and a plurality of memory modules in communication with the processor and with one another. In some such examples, the processor is to send a request for data to a first one of the memory modules, and the data is stored in a distributed configuration in at least the first memory module and a second one of the memory modules. In some such examples, the first memory module is to retrieve a first portion of the data from a first memory location of the first memory module. In some such examples, the second memory module is to retrieve a second portion of the data from a second memory location of the second memory module. In some such examples, the second memory module is to send the first and second portions of the data to the processor.

In some examples, the first and second memory modules are solid state memory modules comprising at least one of dynamic random access memory or non-volatile memory. In some examples, the first and second memory modules are mounted on a single printed circuit board. In some examples, the second memory module is to retrieve the second portion of the data after receiving the first portion of the data at the second memory module from the first memory module. In some examples, the second memory module is to retrieve the second portion of the data without receiving a request for the second portion of the data directly from the processor.

FIG. 1A shows example memory modules 12 and 112 in communication with a processor 10 via a shared bus 14. In the Illustrated example of FIG. 1A, the memory modules 12 and 112 have corresponding smart memory buffers in communication with corresponding memory devices. In examples disclosed herein, some or all memory modules (e.g., one or both of the memory modules 12 and 112) may be permanently installed or mounted in computing devices, and/or some or all memory modules (e.g., one or both of the memory modules 112 and 112) may be removably mountable or attachable to computing devices.

The memory module or memory node 112 of the illustrated example includes a smart memory buffer 100 and a memory 110. In the illustrated example, the smart memory buffer 100 enables placing the example memory module 112 in communication with one or more other memory modules or nodes (e.g., the example memory module 12) having smart memory buffers substantially similar or identical to the smart memory buffer 100, and with one or more processors (and/or external memory controllers). In this manner, networks of interconnected memory modules disclosed herein allow processors and/or external memory controllers to offload complex memory processes onto the memory modules as described below.

In the illustrated example, the smart memory buffer 100 is co-located with the memory 110 on the memory module 112. In some examples, the memory module 112 is implemented using a PCB, and the smart memory buffer 100 is mounted with the memory 110 on the PCB. In other examples, the memory module 112 is implemented using a three-dimensional (3D) stack chip package in which an IC device implementing the smart memory buffer 100 and an IC device implementing the memory 110 are stacked on top of one another in a chip with physical intra-chip interconnections therebetween, and with external connections to the network interface 102.

FIG. 1B is a detailed block diagram of the smart memory buffer 100 implemented in accordance with the teachings of this disclosure. In the illustrated example of FIG. 1B, the smart memory buffer includes an example network interface 102, example control logic 104 (e.g., a logic circuit), an example buffer 106, and an example memory interface 108. While FIG. 1B illustrates an example manner of implementing the smart memory buffer 100, one or more of the elements, processes and/or devices illustrated in FIG. 1B may be combined, divided, re-arranged, omitted, eliminated and/or implemented in any other way. Further, the network interface 102, the control logic 104, the buffer 106, or the memory interface 108 and/or, more generally, the example smart memory buffer 100 of FIG. 1 may be implemented by hardware, software, firmware and/or any combination of hardware, software and/or firmware. Thus, for example, any of the network interface 102, the control logic 104, the buffer 106, and the memory interface 108 and/or, more generally, the example smart memory buffer 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the network interface 102, the control logic 104, the buffer 106, or the memory interface 108 are hereby expressly defined to include a tangible computer readable medium such as a RAM, a read only memory (ROM), a cache, etc. storing the software and/or firmware. Further still, the example smart memory buffer 100 of FIG. 1B may include one or more elements, processes and/or devices in addition to, or instead of, those illustrated in FIG. 1B, and/or may include more than one of any or all of the illustrated elements, processes and devices.

The smart memory buffer 100 of the illustrated example is provided with the example network interface 102 to communicatively couple the smart memory buffer 100 with one or more smart memory buffers of other memory modules or memory nodes and/or with one or more processors or controllers via a shared bus (e.g., the shared bus 14 of FIG. 1A). In the illustrated example, the network interface 102 is provided with network routing functions to manage communications between the smart memory buffer 100 and multiple devices (e.g., other memory modules having smart memory buffers and/or processors) connected thereto via a shared external bus (e.g., the shared bus 14 of FIG. 1B). In this manner, a memory module containing the smart memory buffer 100 can simultaneously provide data services to one or more processors or controllers, and can simultaneously communicate with other memory modules to perform module-to-module (or node-to-node) transfers of data and/or parity information. The network interface 102 of the illustrated example uses a network protocol to arbitrate and manage communications with other devices. Unlike traditional memory interfaces, the network interface 102 allows increased bus capacity by using packet routing, network protocol and arbitration schemes.

The smart memory buffer 100 of the illustrated example is provided with the control logic 104 to manage memory access processes and operations on data and/or parity information stored in a memory 110 of a memory module containing the smart memory buffer 100. The control logic 104 of the illustrated example is configured to perform complex memory access operations (e.g., address translations, parity generation, error correct/detection, etc.) that enable connected processors to off-load computation-intensive memory access processes onto the smart memory buffer 100. In the illustrated example, the control logic 100 is implemented using a logic circuit. However, software and/or firmware may additionally or alternatively be used to implement the control logic 104.

The smart memory buffer 100 of the illustrated example is provided with the buffer 106 to temporarily store incoming data and/or parity information received via the network interface 102 and/or to temporarily store outgoing data for communicating to other devices (e.g., processors, external memory controllers, and/or other smart memory buffers of other memory modules) via the network interface 102.

The smart memory buffer 100 of the illustrated example is provided with the memory interface 108 to communicatively couple the smart memory buffer 100 to the memory 110. In the illustrated example, the smart memory buffer 100 and the memory 110 are co-located on the same memory module (e.g., mounted on the same printed circuit board (PCB) or stacked in the same 3D stack chip). In the illustrated example, the memory interface 108 includes one or more technology-specific memory controllers (e.g., a DRAM controller, an NVRAM controller, etc.) implemented in accordance with one or more technology-specific industry-standard memory interfaces (e.g., a memory interface standard adopted by the JEDEC Solid State Technology Association such as a DRAM interface, an NVRAM interface, etc.). For example, the memory interface 108 may include a DRAM controller having logic to control precharge timing, row-address-strobe (RAS) timings, column-address-strobe (CAS) timings, self-refresh modes, burst access modes, low-power modes, etc.

In the illustrated example, the memory interface 108 is a memory-specific interface intended to facilitate communications with one or more specific types of memories on board of a memory module, while the network interface 102 is not specific to any type of memory technology. In this manner, different memory modules having smart memory buffers like the smart memory buffer 100, and having different types of memory technologies, can communicate with one another via their network interfaces 102 even though their internal memory communications are in accordance with different types of memory interfaces corresponding to their respective memory technologies.

The memory 110 of the illustrated example is a solid state or IC memory device such as a volatile DRAM device or a non-volatile RAM device. The smart memory buffer 100 of the illustrated example enables some memory modules to have a volatile DRAM and other memory modules to have non-volatile RAM. In some examples, the smart memory buffer 100 enables implementing a hybrid memory module having different types of memory such as different types of volatile memory (e.g., DRAM and SRAM) on a single memory module, different types of non-volatile memory (e.g., PCRAM and Memristors) on a single memory module, and/or different types of volatile and non-volatile memory (e.g., DRAM and PCRAM, DRAM and Memristors, etc.) on a single memory module. In some such examples, to implement such hybrid memory modules, the memory interface 108 may include multiple types of technology-specific memory controllers (e.g., DRAM controllers, PCRAM controllers, Memristor controllers, SRAM controllers, etc.) as discussed above so that the memory buffer 100 can communicate with different types of memory technologies on the same memory module. As such, the smart memory buffer 100 of the illustrated example enables implementing memory systems using arrays of memory modules having different types of memory technologies in the form of memory technologies that are different from one memory module to another and/or in the form of hybrid memory modules having different memory technologies within a single memory module.

Figure 2:
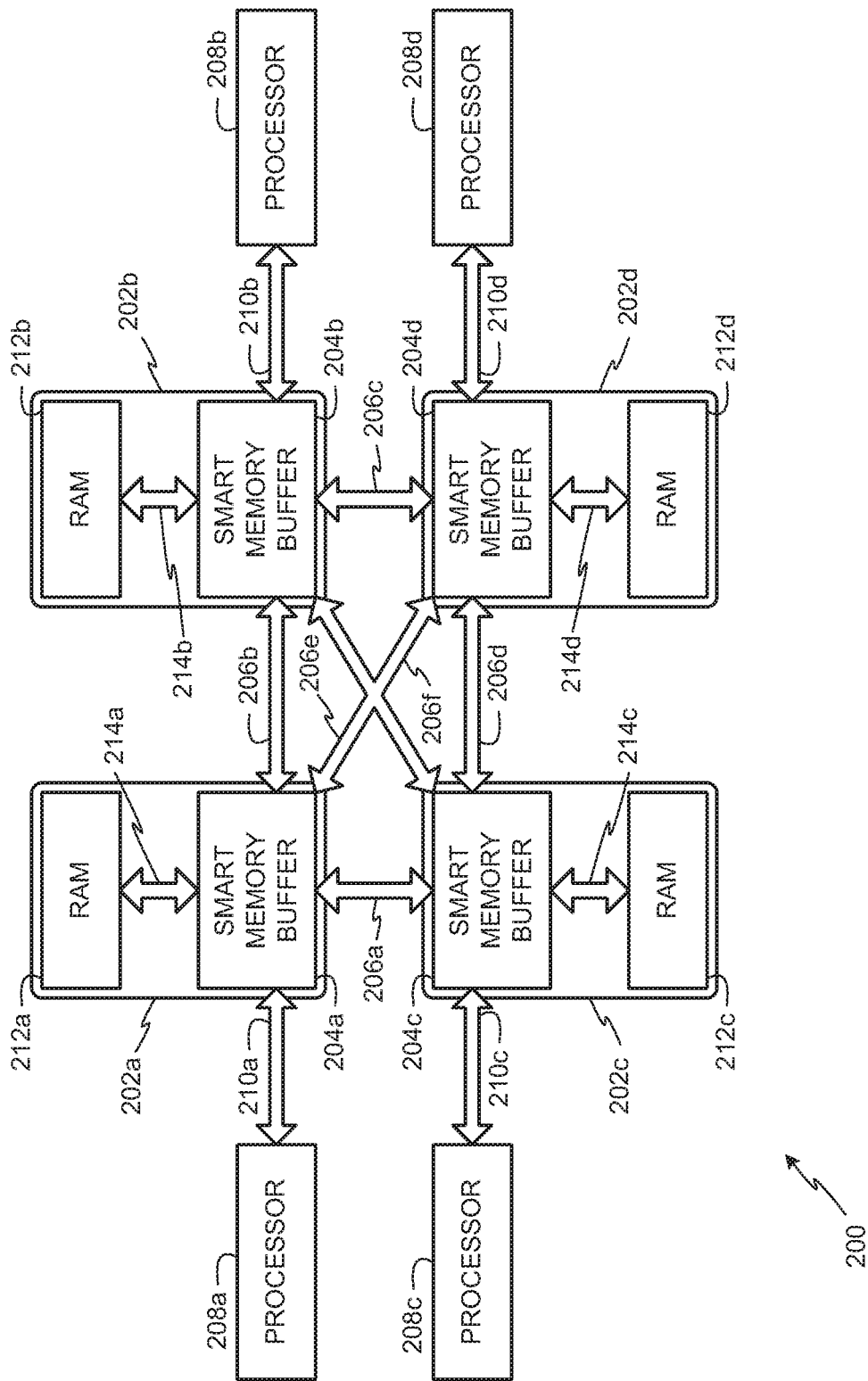
FIG. 2 is an example memory system using smart memory buffers in random access memory (RAM) modules in communication with one another and with processors in accordance with the teachings of this disclosure.

FIG. 2 is an example memory system 200 having example memory modules 202a-d that include smart memory buffers 204a-d. In the illustrated example, the memory modules 202a-d are substantially similar or identical to the memory module 112 of FIGS. 1A and 1B, and the smart memory buffers 204a-d are substantially similar or identical to the example smart memory buffer 100 of FIGS. 1A and 1B. In the illustrated example, the smart memory buffers 204a-d are in communication with one another via inter-memory-module communications 206a-f and with processors 208a-d via processor-memory communications 210a-d in accordance with the teachings of this disclosure. In the illustrated example, the inter-memory-module communications 206a-f and the processor-memory communications 210a-d are implemented using network interfaces of the smart memory buffers 204a-d that are substantially similar or identical to the network interface 102 of FIG. 1.

The smart memory buffers 204a-d enable any of the processors 208a-d to access information stored in any of the memory modules 202a-d via one or more of the inter-memory-module communications 206a-f and the processor-memory communications 210a-d. In this manner, the processors 208a-d can share the memory modules 202a-d, and share data with one another by storing such data in any of the memory modules 202a-d.

In some examples, the network of memory modules 202a-d enables dynamic memory sharing. For example, if the memory modules 202a-d form a total of 1 terabyte (TB) of memory shared equally by the four processors 208a-d (e.g., 256 gigabytes (GB) per processor) through the network of memory modules 202a-d, any one of the processors 208a-d (or a virtual machine running on one of the processors 208a-d) can temporarily demand more capacity than 256 GB. Such efficient sharing of memory space among processors may be advantageously used when non-volatility in NVRAM devices is used to provide storage for fast persistent in-memory objects such as files stored in file systems.

The inter-memory-module communications 206a-f and the processor-memory communications 210a-d represent logical paths of information communicated between the memory modules 202a-d and/or the processors 208a-d, and not necessarily the physical paths therebetween. For example, the smart memory buffers 204a-d and the processors 208a-d may be connected to a shared bus (e.g., the shared bus 14 of FIG. 1A), and the network interfaces (e.g., the network interface 102 of FIG. 1) of the smart memory buffers 204a-d and the processors 208a-d manage and arbitrate communications on the shared bus so that information can be communicated between any one or more of the smart memory buffers 204a-d and one or more of the processors 208a-d on the shared bus via the inter-memory-module communications 206a-f and/or the processor-memory communications 210a-d.

In the illustrated example, the smart memory buffers 204a-d are in communication with corresponding ones of RAM devices 212a-d (e.g., IC or solid state memory devices) via corresponding intra-memory-module communications 214a-d on the memory modules 202a-d. The intra-memory-module communications 214a-d are implemented using one or more formats or protocols different from the inter-memory-module communications 206a-f and the processor-memory communications 210a-d that are implemented by network interfaces (e.g., the network interface 102 of FIG. 1) of the smart memory buffers 204a-d. In the illustrated example, the intra-memory-module communications 214a-d are specific to the type of memory technologies of the RAM devices 212a-d. In this manner, any memory module 202a-d can communicate with any other memory module 202a-d via the inter-memory-module communications 206a-f regardless of whether the memory modules 202a-d have the same or different memory technologies in their RAM devices 212a-d and use different types of intra-memory-module communications 214a-d.

In some examples, the RAM devices 212a-d are all the same memory technology (e.g., all DRAM or all NVRAM) to form a homogeneous memory system. In other examples, the RAM devices 212a-d are implemented using two or more different types of memory technologies to form a hybrid memory system. For example, some of the RAM devices 212a-d may be one or more types of DRAM or SRAM, and others of the RAM devices 212 may be one or more types of NVRAM (e.g., phase-change ram (PCRAM), Memristors, spin-transfer torque random access memory (STT-RAM), etc.). In other examples, the memory devices 212a-d of the memory modules 202a-d may be any type of memory other than RAM.

There are multiple advantages of using the smart memory buffers 204a-d. For example, with the network interface 102 of the smart memory buffers 204a-d, a memory-technology-specific physical channel need not be provided on a processor (or external memory controller) for each different type of memory technology with which the processor (or external memory controller) needs to be in communication. This saves pin-out usage and pin multiplexing on processor chips. The network interface 102 also improves the usage efficiency of off-chip channel bandwidth by running all memory access traffic (e.g., the processor-memory communications 210a-d) on a single physical memory channel of a processor rather than running multiple physical memory channels on a processor where some channels remain idle for long periods during which memories connected to those channels are not accessed.

The smart memory buffers 204a-d enable performing direct memory-to-memory data transfers as described in detail below. Direct memory-to-memory data transfers improve data access efficiencies in multiple manners by not requiring a processor to be involved in each operation required to transfer data between different memory modules. For example, after receiving a direct memory-to-memory transfer request from a processor (or an external memory controller), one or more of the smart buffers 204a-d can manage the requested data transfer between designated memory modules in an efficient manner without further intervention by the processor (or external memory controller). Such data transfers are useful to perform, for example, data block fill/eviction for DRAM caches, data page migration/demotion in partitioned flat memory space, and checkpointing in high performance computing systems (HPCS). In addition, direct memory-to-memory transfer requests enable a processor to access other memory while the transfer is done in parallel between memory modules.

In some examples, the smart memory buffers 204a-d are used to implement tag/meta-data storage and associated cache controllers to implement DRAM caches. Such DRAM caches may be more cost-effective than prior caches due to the lower cost of DRAM memory relative to embedded SRAM that is traditionally used to implement caches.

In some examples, in addition to allowing processors to offload memory access-intensive operations onto the smart memory buffers 204a-d, the smart memory buffers 204a-d are also provided with logic (e.g., the control logic 104, or a portion thereof, of FIG. 1B) to perform one or more of data compression/decompression, data encryption/decryption to provide data security, and error-correcting code (ECC) encoding/decoding to implement memory protections. For example, when checkpointing DRAM data to NVRAM (in HPCS), compression can reduce checkpoint storage and time. In prior systems, data in DRAM is first fetched to the on-chip cache, an external processor compresses the data, and the processor writes the compressed data to NVRAM. However, example smart memory buffers disclosed herein may be used to implement direct memory-to-memory transfers as describe in more detail below, and the smart memory buffers can further be provided with compression logic to compress the data on-the-fly so that the data need not be compressed by the external processor, thereby saving cycles required by the external processor and bus cycles on a bus between the processor and memory.

Example smart memory buffers disclosed herein also enable improved security of data stored in NVRAM to make stored data less vulnerable to malicious attackers even while a system is powered down. For example, disclosed smart memory buffers may be provided with decryption/encryption logic to implement different desired levels of data security to allow for using different security strategies for different types of memory and/or different types of data. In some examples in which memory modules are removably attachable or mountable to computing devices, decryption/encryption logic on the memory modules is useful to secure data on the removably attachable memory modules (e.g., NVRAM memory modules that persist data even without being actively powered) against theft or other attacks when the memory modules are removed from computing devices. Another example advantage of providing decryption/encryption logic on memory modules, is that new, updated, or different (e.g., stronger) decryption/encryption algorithms may be adopted by users by buying new memory modules having the decryption/encryption algorithms instead of needing to buy new or different computing devices with the new, updated, or different decryption/encryption algorithms.

In some examples, the smart memory buffers 204a-d enable efficiencies with physical interconnections, memory space usage, and inter-device communications by allowing multiple processors to share data across multiple memory modules within a single enclosure (or PCB) or across separate enclosures (or PCBs). Memory module sharing also enables the memory modules 202a-d to operate as multi-ported memories to provide high availability of access (for any connected processor 208a-d in the same or separate enclosure (or PCB)) and relatively strong reliability, for example, by implementing RAID configurations across the memory modules 202a-d.

RAID Configurations

Figure 3:
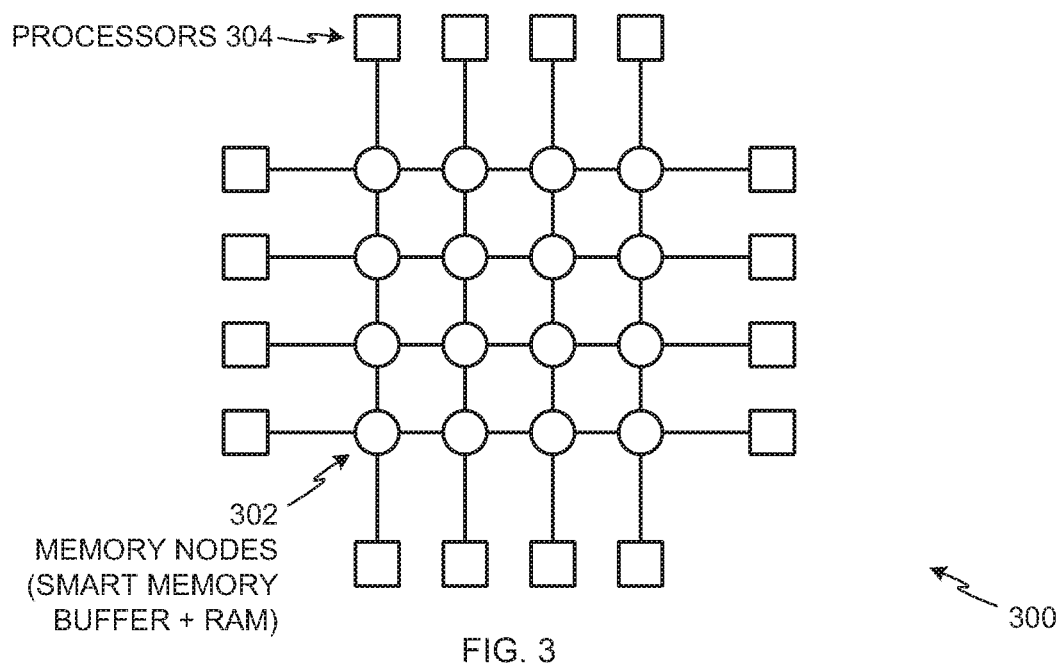
FIG. 3 shows an example system of interconnected memory nodes and processors that may be used to implement a redundant array of independent disks (RAID) memory system.

FIG. 3 shows an example system 300 of interconnected memory nodes 302 (represented by circles) and processors 304 (represented by squares) that may be used to implement an example redundant array of independent disks (RAID) memory system. In some examples, the example system 300 of interconnected memory nodes 302 and processors 304 is implemented on a single apparatus or device. In other examples, the interconnected memory nodes 302 are implemented on a single apparatus or device, and the processors 304 are distributed across one or more other devices and are in communication with the memory nodes 302 via inter-device communications across the separate devices.

In the illustrated example, the memory nodes 302 are substantially similar or identical to the memory modules 202a-d of FIG. 2, and have smart memory buffers substantially similar or identical to the smart memory buffer 100 of FIGS. 1A and 1B. In some examples, the memory nodes 302 all have DRAM devices or all have NVRAM devices. In other examples, some of the memory nodes 302 have DRAM devices and others of the memory nodes 302 have NVRAM devices to implement a hybrid memory system. In any case, network interfaces (e.g., the network interface 102 of FIG. 1) of the memory nodes 302 communicatively couple the memory nodes 302 to one another, and communicatively couple at least some of the memory nodes to separate processors 304 to allow the processors 304 to access data stored in any of the memory nodes 302. In this manner, the memory nodes 302 are in communication with one another using inter-memory-module communications (e.g., the inter-memory-module communications 206a-f of FIG. 2), and are in communication with the processors 304 using processor-memory communications (e.g., the processor-memory communications 210a-d of FIG. 2) as shown in FIG. 3. In addition, logic circuits (e.g., the control logic 104 of FIG. 1B) provided in the memory nodes 302 are used to generate parity information (e.g., parity values 'P' shown in FIG. 4) to store in a distributed arrangement as discussed below in connection with FIG. 4 across at least some of the plurality of interconnected memory nodes 302.

In some examples, the interconnections shown in FIG. 3 between the memory nodes 302 and the processors 304 are physical connections. In other examples, the interconnections shown in FIG. 3 are logical connections (only some logical connections are shown), and the memory nodes 302 and the processors 304 are physically connected to one another via one physical network bus on which all of the memory nodes 302 and the processors 304 are mounted.

Figure 4:
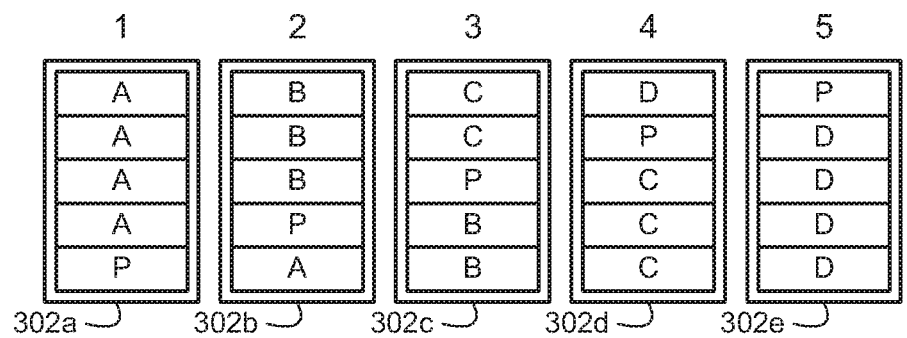
FIG. 4 is an example RAID data storage organization for use with the memory nodes of FIG. 3 to implement an example RAID memory system.

FIG. 4 is an example RAID data storage organization 400 for use with the memory nodes 302 of FIG. 3 to implement an example RAID memory system. In the illustrated example, the RAID data organization 400 is shown in connection with five memory nodes 302a-e. In the illustrated example of FIG. 4, data 'A', 'B', 'C', and 'D' represent data stored across the memory nodes 302a-e in a striped arrangement, and a parity value 'P' stored in one of the memory nodes 302a-e represents a parity of the data stored across the other four memory nodes 302a-e also in a striped arrangement. In the illustrated example, the location of the parity 'P' is interleaved, as similarly done in RAID-5 systems, to not cause contention on any specific memory location. Using the RAID organization of FIG. 4 enables data to be recovered whenever any one of the memory nodes 302a-e fails.

Although five memory nodes 302a-e are shown in FIG. 4, fewer or more memory nodes may be used in other examples. For example, RAID configurations may be implemented using sets of four memory nodes, eight memory nodes, and/or any other number of nodes using memory modules disclosed herein. In some examples, the RAID configurations are dynamic in which further memory nodes can be added dynamically, and the smart memory buffers in the memory nodes manage the redistribution of stored data across the existing and newly added memory nodes. In some examples, the RAID configurations are static, in which the number of memory nodes does not change. In addition, although single parity is shown in FIG. 4, double parity may alternatively be employed, as similarly used in RAID-6, to provide the ability to recover from the failures of two memory nodes.

Write Processes

The example smart memory buffer 100 of FIG. 1 is useful for implementing arrays of interconnected memory modules (e.g., the memory modules 202a-d of FIG. 2) that enable relatively more efficient processor-to-memory write operations than achievable using prior memory technologies.

Figure 5:
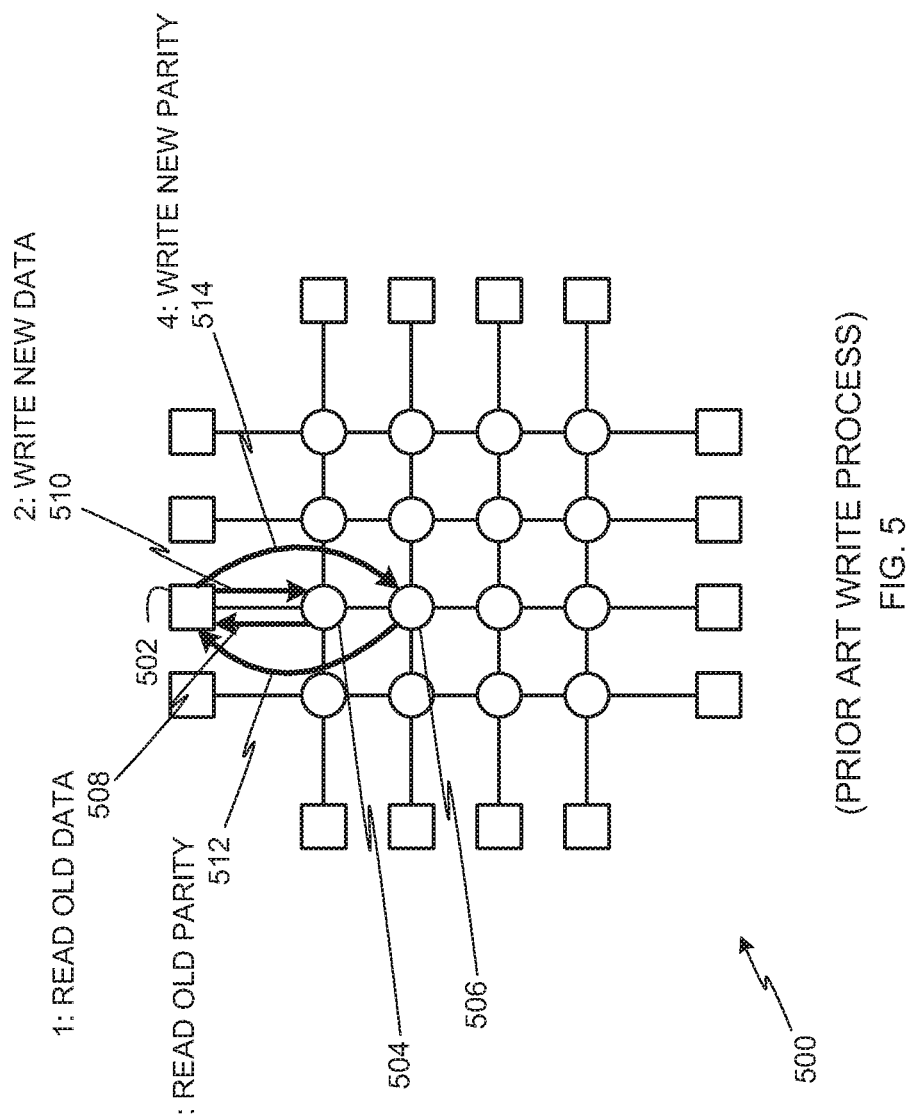
FIG. 5 is a prior art write process in a memory system of interconnected memory nodes and processors.

FIG. 5 shows a prior art write process between a processor 502 and a memory node 504 in a memory system 500 implementing parity-based data protection. The prior art write process of FIG. 5 involves a relatively high-level of intervention or involvement by the processor 502 to write data to the memory node 504 and parity to another memory node 506. The prior art write process of FIG. 5 requires the processor 502 to be involved in four steps. In a first communication 508, the processor 502 reads old data from the memory node 504. In a second communication 510, the processor 502 writes new data to the memory node 504. In a third communication 512, the processor 502 reads old parity information from the memory node 506 so that the processor 502 can generate new parity information. The processor 502 generates the new parity information by performing an EXCLUSIVE-OR (XOR) operation on the old data, the new data, and the old parity (e.g., new parity=old data (XOR) new data (XOR) old parity). After the processor 502 generates the new parity information, the processor 502 writes the new parity information to the memory node 506 in a fourth communication 514.

Figure 6:
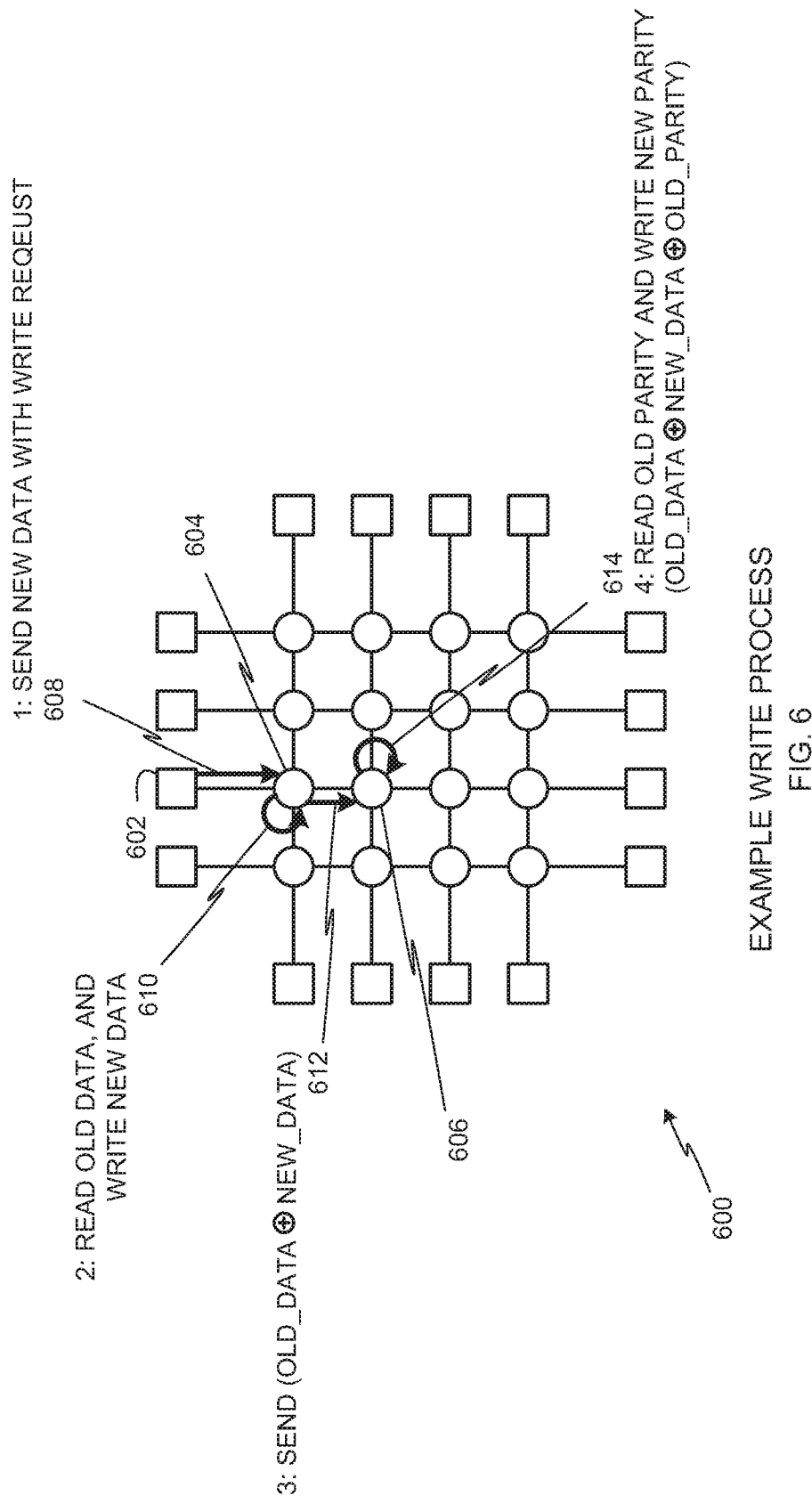
FIG. 6 is an example write process in a memory system of interconnected memory nodes and processors in accordance with the teachings of this disclosure.

FIG. 6 is an example write process in accordance with the teachings of this disclosure between an example processor 602 and an example memory node 604 in an example memory system 600 implementing parity-based data protection. The write process of the illustrated example may be used in connection with the RAID configuration of FIGS. 3 and 4 and/or with any other memory configuration. In the example write process of FIG. 6, the example memory node 604 writes data to its memory, and an example memory node 606 writes parity information to its memory. The example memory nodes 604 and 606 of the illustrated example are substantially similar or identical to the memory module 112 of FIG. 1.

In the illustrated example, the processor 602 sends a single write request communication 608 to the memory node 604 requesting to write new data to a memory location in the memory node 604. After the processor 602 sends the write request communication 608 to the memory node 604, the memory nodes 604 and 606 handle the operations for writing data and parity without further intervention by the processor 602. For example, a smart memory buffer of the memory node 604 reads old data from the memory location specified by the processor 602, and writes the new data to the memory location (operation 610). In the illustrated example, the smart memory buffer of the memory node 604 does not send the old data back to the processor 602, as is done in the prior art write process of FIG. 5 in which the memory node 504 sends old data to the processor 502 at communication 508.

The smart memory buffer of the memory node 604 sends the old data and the new data to the memory node 606 (communication 612). In the illustrated example, the smart memory buffer of the memory node 604 performs an EXCLUSIVE-OR (XOR) operation on the old data and the new data, and sends the result of the XOR operation to the memory node 606 at communication 612. In other examples, the smart memory buffer of the memory node 604 does not perform an XOR operation on the old and new data, and instead, the memory node 606 performs the XOR operation on the old and new data after receiving the old and new data from the memory node 604. A smart memory buffer of the memory node 606 reads the old parity from a parity storage location corresponding to the new data stored in the memory node 604, and determines and writes new parity information based at least on the new data stored in the memory node 604 (operation 614). In the illustrated example, the memory node 606 does not need the processor 602 to determine the new parity, unlike the prior art write process of FIG. 5, which requires communications 512 and 514 with the processor 502 so that the processor 502 can determine new parity information. In the illustrated example of FIG. 6, control logic (e.g., the control logic 104) in the smart memory buffer of the memory node 606 determines the new parity information by performing an EXCLUSIVE-OR (XOR) operation on the old data, the new data, and the old parity. However, other techniques for determining parity information may be used instead by the memory node 606. Although not shown in FIG. 6, the memory node 606 and/or the memory node 604 may send the processor 602 a communication confirming successful completion of the requested write operation if it completed successfully, or unsuccessful completion of the requested write operation if it could not be completed successfully.

The example write process of FIG. 6 makes more efficient bus utilization and more efficient use processor resources by needing less communications (e.g., only a single communication in the illustrated example of FIG. 6) from the processor 602 to implement a write process in accordance with the teachings disclosed herein relative to the number of communications required from the processor 502 of FIG. 5 to implement the example prior art write process of FIG. 5.

Forwarded Write Processes

In some examples, a memory node may request that another memory node perform one or more data writes. In some examples, a memory node may do this in response to receiving a write request from a processor (or an external memory controller) to write data to a destination memory node other than the memory node that received the initial write request from the processor. In some examples, a memory node may operate as a DRAM cache and, from time to time, may forward write requests to an NVRAM memory node to write through data for longer-term storage in the NVRAM memory node.

Figure 7:
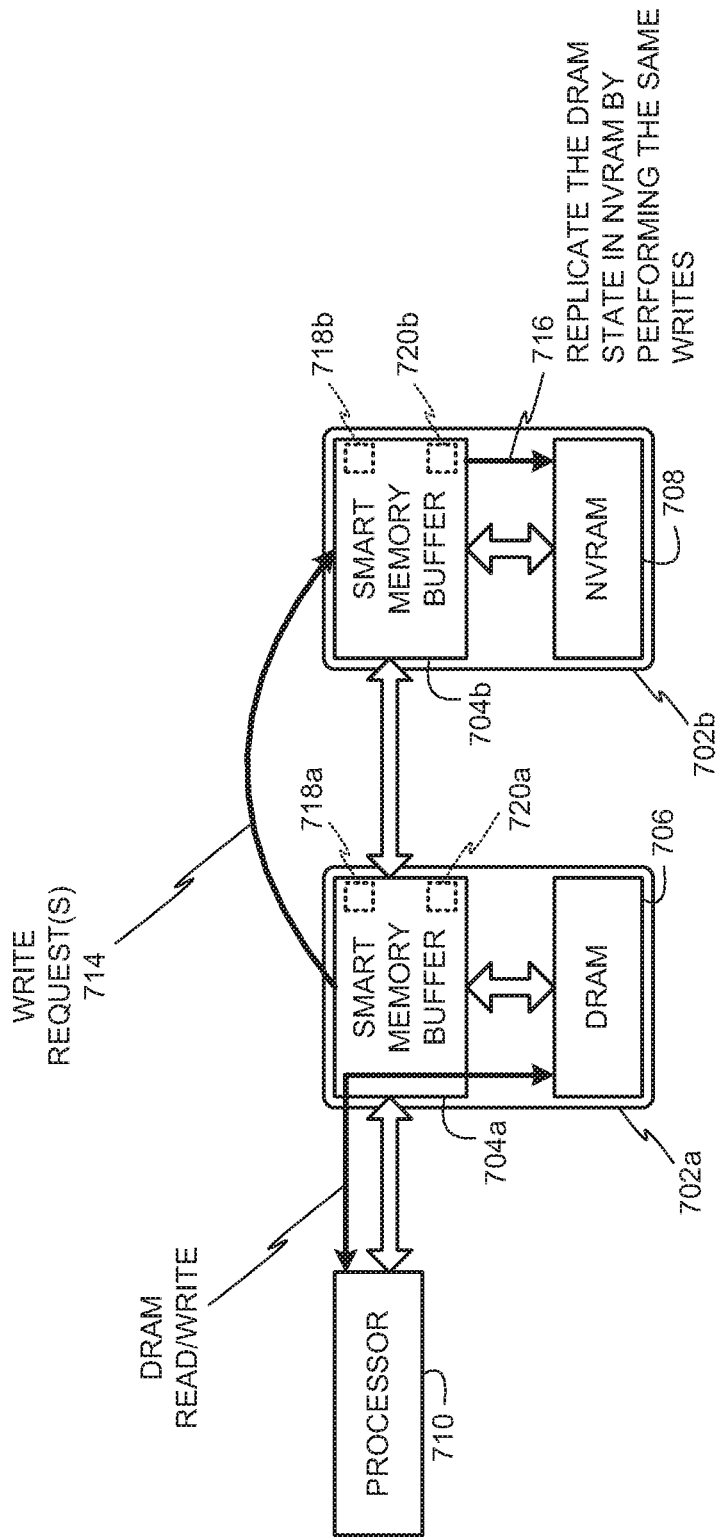
FIG. 7 is an example forwarded write process using the smart memory buffer of FIGS. 1A and 1B to write-through data from a volatile RAM to a non-volatile RAM (NVRAM).

FIG. 7 is an example forwarded write process using memory modules 702a-b having smart memory buffers 704a-b to write-through data from a volatile DRAM device 706 of the memory module 702a to an NVRAM device 708 of the memory module 702b. The example forwarded write process of the illustrated example of FIG. 7 may be used in connection with the RAID configuration of FIGS. 3 and 4 and/or with any other memory configuration. The smart memory buffers 704a-b of the illustrated example are substantially similar or identical to the smart memory buffer 100 of FIGS. 1A and 1B. In a hybrid memory system (e.g., the DRAM and NVRAM configuration of FIG. 7), DRAM can be used as a hardware-managed cache (DRAM cache) or a software-managed low-latency physical memory region (partitioned flat memory space). In the illustrated example of FIG. 7, the memory module 702a is a hardware-managed cache (e.g., a DRAM cache) that a processor 710 uses for accessing (e.g., reading and/or writing) data relatively quickly, and the memory module 702b is long-term storage that, from time-to-time, is updated to store replicated data from the DRAM device 706 for longer-term storage in the NVRAM device 708. In the illustrated example, the data in the DRAM device 706 is data that was originally sourced from or originated at the processor 710 (e.g., the processor 710 wrote the data to the DRAM device 706).

In the illustrated example, the processor 710 performs DRAM read and/or write operations on the DRAM device 706 of the memory module 704a. In the illustrated example, the smart memory buffer 704a of the memory module 702a sends one or more write request(s) 714 to the smart memory buffer 704b of the memory module 702b. In the illustrated example, the smart memory buffer 704b replicates the state of the DRAM device 706 in the NVRAM device 708 by writing the same data that was written in the DRAM device (operation 716).

In some examples, the smart memory buffer 704a and/or the smart memory buffer 704b is/are provided with corresponding compression/decompression logic 718a, 718b and/or encryption/decryption logic 720a, 720b. In this manner, the smart memory buffer 704a and/or the smart memory buffer 704b may perform any encryption/decryption and/or compression/decompression needed to implement data security and/or data compression features on the data written to the DRAM device 706 and/or the NVRAM device 708 without needing the processor 710 to use its resources to perform the encryption/decryption and/or compression/decompression processes. Compression/decompression logic and/or encryption/decryption logic (e.g., substantially similar to the compression/decompression logic 718a, 718b and/or the encryption/decryption logic 720a, 720b) may be provided to any of the example smart memory buffers disclosed herein to enable the smart memory buffers to perform compression/decompression processes and/or encryption/decryption processes, thereby allowing processor to offload such processes to the example smart memory buffers.

In some examples, the one or more write request(s) 714 correspond to one or more write request(s) received at the memory module 702a from the processor 710, so that after the smart memory buffer 704a writes data received from the processor 710 in the DRAM device 702a, the smart memory buffer 704b forwards the one or more write request(s) from the processor 710 with the same data to the smart memory buffer 704b so that the smart memory buffer 704b can replicate the same data in the NVRAM device 702b for longer-term storage. In this manner, the memory module 702a operates as a quick-access DRAM cache for immediate storage of data from the processor 710 so that the processor 710 can more quickly perform processes that involve heavy data access traffic (e.g., storing a large file in memory), while the memory modules 702a and 702b handle the replicating of stored data into the memory module 702b as a parallel process for long-term storage without needing intervention by the processor 710 to perform such data replication.

In other examples, the smart memory buffer 704a may not send the one or more write request communication(s) 714 immediately in response to write request(s) received from the processor 710. Instead, the smart memory buffer 704a may send the one or more write request communication(s) 714 to the memory module 702b in response to some other stimuli, such as, an automatic event generated by control logic (e.g., the control logic 104 of FIG. 1B) of the smart memory buffer 704a. In this manner, the smart memory buffer 704a can generate a node-to-node copy request using an automatic event generated at the smart memory buffer 704a without intervention from an external device (e.g., without intervention by the processor 710). The automatic event may be generated using a timer, a counter, and/or any other stimuli that generates an event triggering the smart memory buffer 704a to send the write request communication(s) 714 to perform write-through processes to replicate data from the DRAM device 706 in the NVRAM device 708.

In some examples, the memory module 702a is the memory node 604 of FIG. 6, the processor 710 is the processor 602 of FIG. 6, and the memory module 702b is another memory node in the example memory system 600 of FIG. 6. In such examples, the memory node 702a also sends a write request communication 714 of FIG. 7 to the memory module 702b in response to receiving the new data and write request communication from the processor 602. In such examples, the memory module 702b can work with the memory node 604 as described above in connection with FIG. 6 to write new parity information in the memory node 604 based on the new data replicated in the NVRAM device 708 of the memory module 702b of FIG. 7.

Direct Memory-to-Memory Transfers

Figure 8:
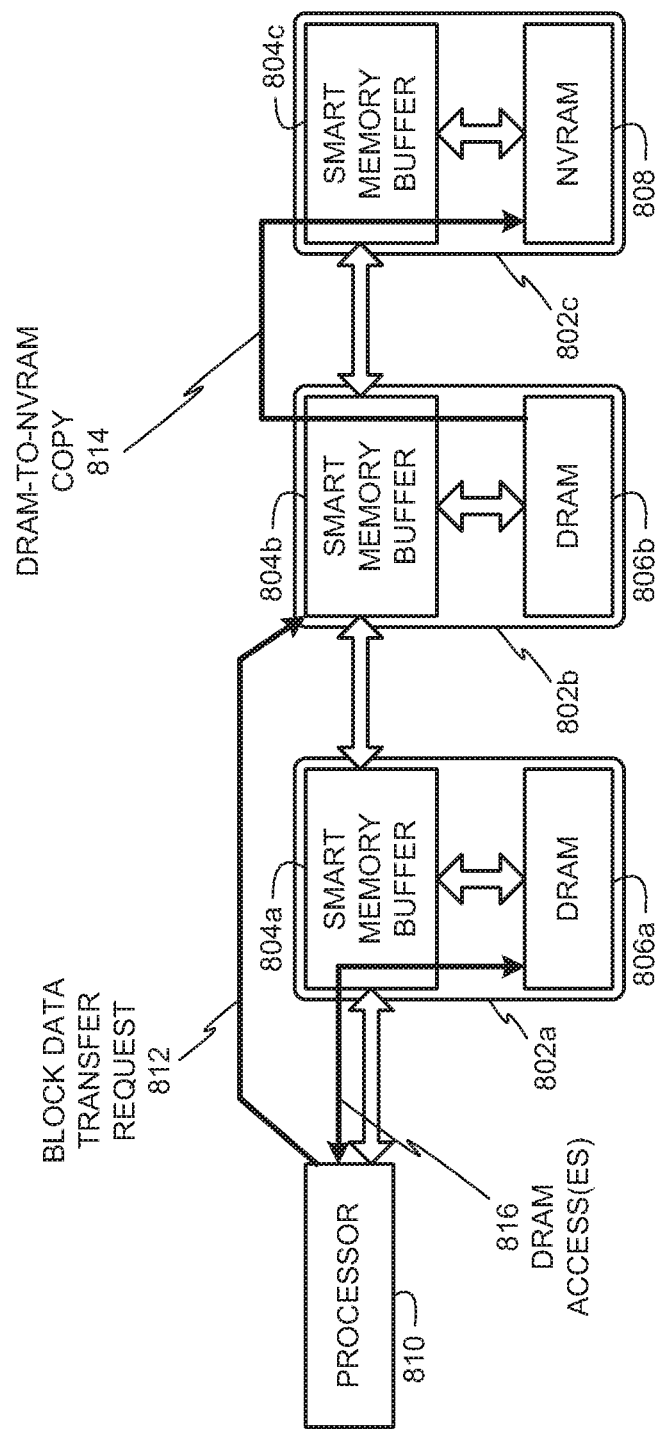
FIG. 8 is an example process to perform a direct memory-to-memory transfer between two or more memory modules having the smart memory buffer of FIGS. 1A and 1B.

FIG. 8 is an example process to perform a direct memory-to-memory transfer between two memory modules 802b and 802c having smart memory buffers 804b and 804c. The example direct memory-to-memory transfer process of the illustrated example of FIG. 8 may be used in connection with the RAID configuration of FIGS. 3 and 4 and/or with any other memory configuration. The smart memory buffers 804b and 804c of the illustrated example are substantially similar or identical to the smart memory buffer 100 of FIGS. 1A and 1B. The example memory configuration of FIG. 8 is a hybrid memory system having DRAM devices 806a and 806b in the memory modules 802a and 802b, and an NVRAM device 808 in the memory module 802c.

Prior hybrid memory systems (e.g., the memory configuration of FIG. 8) having hardware-managed cache (e.g., DRAM cache) and/or a software-managed low-latency physical memory region (partitioned flat memory space) use relatively large numbers of data transfers to/from DRAM and NVRAM (e.g., to perform write-through operations, cache fill/eviction in DRAM caches, and/or page migration/demotion in partitioned flat memory space). In prior memory systems, a memory device cannot be a master of a memory bus. As such, some prior systems use a separate memory controller to read a block of data from one memory, buffer the data block, then write out the data block to another memory to perform a memory-to-memory transfer. Drawbacks of such prior art memory-to-memory transfer processes are that memory bus bandwidth is poorly utilized (the amount of actual data transferred is twice the block size), the memory controller cannot use the memory bus to access other data during the block transfer, and the memory-to-memory transfer processes yield poor bus utilization due to frequent read/write switching. In newer DRAM devices, read/write switching incurs longer delays as a result of increasing read/write turnaround penalties specified for newer DRAM buses.

Example smart memory buffers disclosed herein may be used to implement direct memory-to-memory copy operations that require less or no intervention by a processor after an initial request from the processor to perform the copy. For example, in the illustrated example of FIG. 8, a processor 810 sends a block data transfer request 812 to the memory module 804*b* requesting to copy a specified block or blocks of data from the memory module 804*b* to the memory module 804*c*. The smart memory buffer 804*b* of the memory module 802*b* receives the block data transfer request 812, and the smart memory buffer 804*b* communicates with the smart memory buffer 804*c* of the memory module 802*c* to perform a DRAM-to-NVRAM copy process 814 of the requested block(s) of data from the DRAM device 806*b* to the NVRAM 808 without further intervention by the processor 810. In this manner, the processor 810 can continue to perform other processes including, for example, DRAM access(es) 816 in the memory module 802*a* while the smart memory buffers 804*b* and 804*c* perform the DRAM-to-NVRAM copy 814 in parallel.

In the illustrated example, after the initial block data transfer request 812 sent by the processor 810, the processor 810 is no longer involved with performing the DRAM-to-NVRAM copy process 814, and when the copy process 814 is complete, the smart memory buffer 804*b* or the smart memory buffer 804*c* sends a communication to the processor 810 confirming that the requested copy process successfully completed. In some examples, if the copy process 814 does not complete successfully, the smart memory buffer 804*b* or the smart memory buffer 804*c* may instead communicate a failure notification to the processor 810.

DRAM Cache

Figure 9:
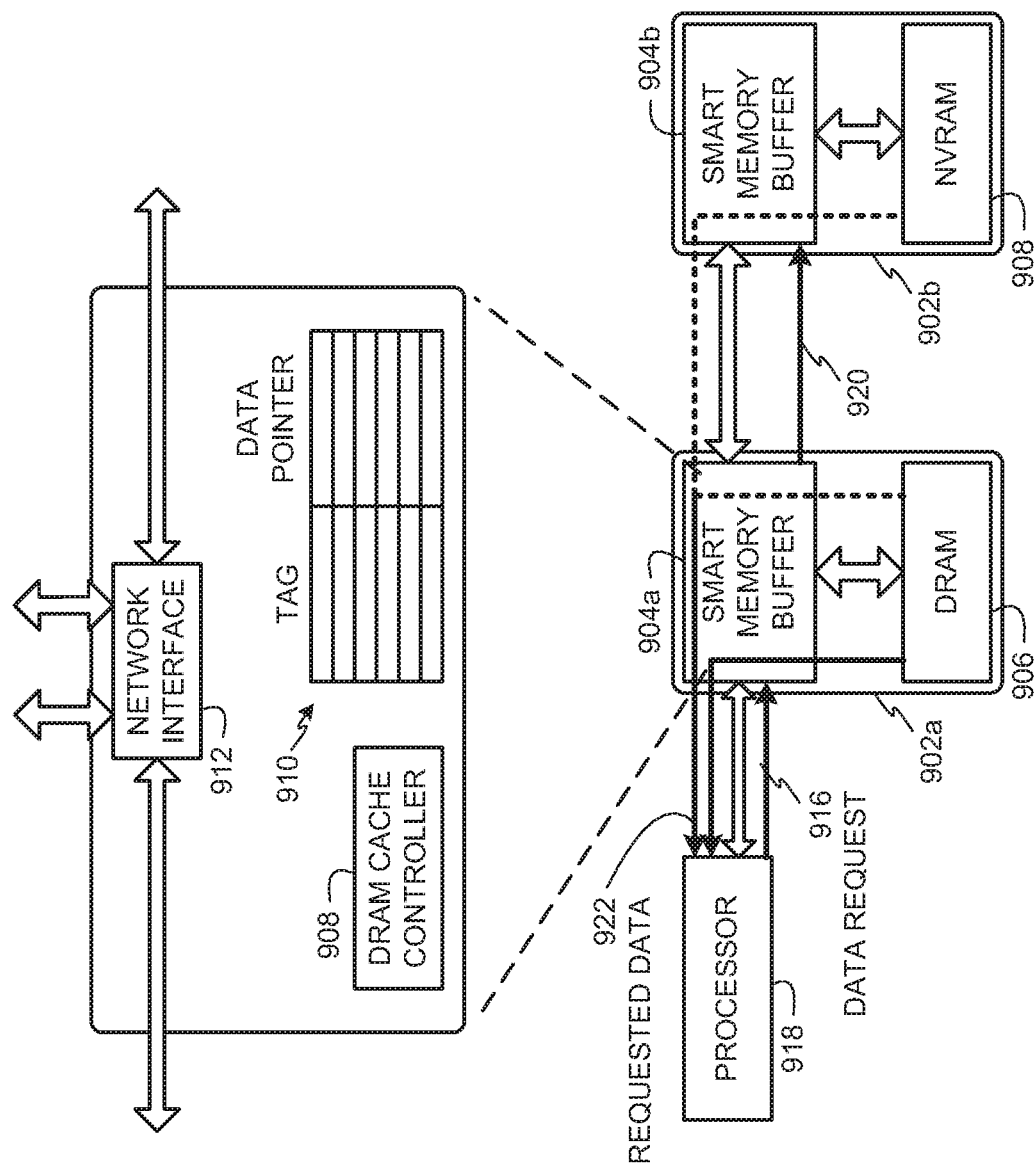
FIG. 9 is an example dynamic RAM (DRAM) cache implemented using the smart memory buffer of FIGS. 1A and 1B.

FIG. 9 is an example DRAM cache implemented using a memory module 902*a* having an example smart memory buffer 904*a* and a DRAM device 906. The example DRAM cache of the illustrated example of FIG. 9 may be used in connection with the RAID configuration of FIGS. 3 and 4 and/or with any other memory configuration. The example smart memory buffer 904*a* is substantially similar to the smart memory buffer 100 of FIGS. 1A and 1 B. To use the DRAM device 906 as a DRAM cache in the illustrated example of FIG. 6, the smart memory buffer 904*a* has additional features (e.g., a DRAM cache controller, tag storage, and metadata storage) that enable it to implement a DRAM cache using a standard commodity DRAM as the DRAM device 906. In some examples, the smart memory buffer 904*a* includes an SRAM or embedded DRAM (eDRAM) to implement the additional features.

In the illustrated example, the smart memory buffer 904*a* includes a DRAM cache controller 908, a metadata data structure 910 to store tags and corresponding data or pointers, and a network interface 912 (e.g., substantially similar or identical to the network interface 102 of FIG. 1). In the illustrated example, the smart memory buffer 904*a* receives a data request 916 from a processor 918 (or an external memory controller (not shown)). In response to the data request 916, the DRAM cache controller 908 determines a cache hit/miss using the tags stored in the metadata data structure 910. If the DRAM cache controller 908 determines that a cache hit (e.g., the requested data is stored in the DRAM device 906) has occurred, the smart memory buffer 904*a* services the data request 916 by retrieving the requested data from the DRAM device 906 based on a corresponding data pointer stored in the metadata data structure 910. If the DRAM cache controller 908 determines that the request 916 results in a cache miss (e.g., the requested data is not stored in the DRAM device 906), the network interface 912 of the smart memory buffer 904 sends a data request 920 to another memory module. In the illustrated example of FIG. 9, the network interface 912 sends the data request 920 to the memory module 902*b* to request the same data that was requested in the data request 916. In this manner, the smart memory buffer 904*b* of the memory module 902*b* can send the requested data 922 from the NVRAM device 908 to the processor 918 (or external memory controller) that initially sent the data request 916. In the illustrated example, the smart memory buffer 904*b* sends the requested data 922 to the processor 918 through the smart memory buffer 904*a*. In this manner, the smart memory buffer 904*a* can update the DRAM device 906 with the requested data 922, and update corresponding information in the metadata data structure 910.

The DRAM cache configuration of FIG. 9 may be configured to use different DRAM cache line sizes to processor request sizes. For example, while the processor 918 requests a 64-byte data block, the memory module 902*a*, operating as a DRAM cache, can manage larger data blocks (e.g., 4 kB or larger) to reduce tag storage overhead using techniques such as a sector caching or a decoupled caching. In addition, the DRAM cache configuration of FIG. 9 does not require custom designed DRAM nor does it require storing tags at the processor 918 or external memory controller to implement the DRAM cache.

Gather/Scatter Operations

Example smart memory buffers disclosed herein may also be used to implement memory systems that use gather operations to read distributed data stored in a plurality of interconnected memory nodes and/or scatter operations to write data in a distributed fashion to a plurality of interconnected memory nodes. In this manner, the example smart memory buffers enable reading/writing distributed data with relatively more efficiency than prior memory systems.

FIG. 10 is a prior art manner in which a processor 1002 can read data distributed among several memory nodes 1004 in a RAID organization. In the prior art manner of reading distributed data of FIG. 10, the processor 1002 communicates separate read requests to separate memory nodes 1004 (e.g., five read separate requests to five separate memory nodes 1004 in the illustrated example) to read data that is distributed across the five separate memory nodes 1004. In the illustrated example, each of the five separate memory nodes 1004 returns a corresponding response with a portion of the requested data stored therein, resulting in the processor 1002 needing to receive and process five separate responses. This results in poor access times and poor utilization of processor and bus resources.

FIG. 11 is an example gather/scatter process to enable a processor 304 to read/write data distributed across several memory nodes 302 in the RAID organization of the example system 300 of FIG. 3 in accordance with the teachings of this disclosure. The memory nodes 302 of the illustrated example are substantially similar or identical to the example memory module 112 of FIGS. 1A and 1B.

In the illustrated example, the processor 304 sends an initial data read request 1102 to a first memory node 302*a*. The initial data request 1102 causes the memory node 302*a* to retrieve a portion of the requested data that is stored in a memory location of its memory device (e.g., the memory 110 of FIGS. 1A and 1B), and to forward the retrieved partial data and a data request to a second memory node 302*b*. In the illustrated example of FIG. 11, partial data and forwarded data requests are represented by arrows between five memory nodes 302a-e. When each of the memory nodes 302b-e receives partial data and a forwarded data request from a previous one of the nodes 302a-d, the receiving memory node 302b-e retrieves its portion of the requested data from a memory location in its memory device, joins or concatenates its data portion to the received partial data, and sends the updated partial data and a forwarded data request to a next one of the memory nodes 302b-e. When the last memory node 302e in the gather sequence retrieves its portion of the requested data, it joins or concatenates its data portion to the partial data that it received from the previous memory node 302d to form the entirety of the requested data. In addition, the memory node 302e sends the entirety of the requested data to the processor 304 in a requested data response 1104. Thus, in the illustrated example, the processor 304 need only send out the initial data read request 1102 and receive the requested data response 1104 without needing to send a separate data request to each of the memory nodes 302a-e. In this manner, the memory nodes 302b-e retrieve their respective portions of the requested data without receiving a request for such portions of the data directly from the processor 304.

A data scatter sequence to write data across the memory nodes 302a-e may be similarly implemented. In such an example, the processor 304 sends an initial data write request (instead of the initial data read request 1102) to the memory node 302a with the data to be written, and an address range to which the data is to be written. Smart memory buffers in the memory nodes 302a-e then use the address range in the data write request to determine which portions of the data should be written to which memory locations across different ones of the memory nodes 302a-e based on forwarded data write requests sent between the memory nodes 302a-e, for example, along the same path of arrows between the memory nodes 302a-e shown in FIG. 11. The memory node 302e can then send a final communication of success or failure to the processor 304. In this manner, the processor 304 need not send separate write requests to the separate memory nodes 302a-e, but instead need only send an initial data write request to the memory node 302a, and receive a final success or failure communication from the memory node 302e.

In the illustrated example, smart memory buffers in the memory nodes 302a-e may store mapping tables showing which of the memory nodes 302a-e store which ranges of addresses corresponding to memory addresses communicated by the processor 304 in data read requests (e.g., the initial data request 1102) and/or data write requests. In this manner, the memory nodes 302 can determine whether they are assigned address ranges of pertinent data and which other memory nodes 302 are assigned address ranges of data pertinent to different portions of data read/write requests.

Although the example of FIG. 11 shows data distributed across five memory nodes 302a-e, the gather/scatter techniques of FIG. 11 may be performed for data distributed across fewer or more nodes.

Although the examples processes of FIGS. 6-9 and 11 are shown and described independent of one another, in some examples any one or more of the example processes of FIGS. 6-9 and 11 may be performed together in parallel or in seriatim on the same memory system using the same and/or different memory modules or memory nodes.

Although the above discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the above describes example methods, apparatus, and articles of manufacture, the examples provided are not the only way to implement such methods, apparatus, and articles of manufacture. Thus, although certain methods, apparatus, and articles of manufacture have been described herein, the scope of coverage of this patent is not limited thereto. To the contrary, this patent covers all methods, apparatus, and articles of manufacture fairly falling within the scope of the claims either literally or under the doctrine of equivalents.

What is claimed is:

1. A method to write data in a memory node, comprising:
receiving, at a first memory node, new data to be written at a memory location in the first memory node, the new data received from a device;
at the first memory node, reading old data from the memory location, without sending the old data to the device;
at the first memory node, writing the new data to the memory location; and
sending the new data and the old data from the first memory node to a second memory node to store parity information in the second memory node without the device determining the parity information, the parity information based at least on the new data stored in the first memory node.

2. A method as defined in claim 1, wherein the device is a processor, and the first memory node is in communication with the processor and the second memory node via a network interface.

3. A method as defined in claim 1, further comprising, after receiving the new data at the first memory node, not requiring further communications with the device to write the new data in the memory location and to send the new data and the old data from the first memory node to the second memory node.

4. A method as defined in claim 1, wherein the device is a third memory node in network communication with the first memory device, the data being forwarded data sourced by a processor in communication with the third memory node.

5. A method as defined in claim 1, further comprising, in response to a node-to-node copy request, sending the data stored at the memory location of the first memory node from the first memory node to a third memory node for writing to the third memory node.

6. A method as defined in claim 5, further comprising receiving the node-to-node copy request at the first memory node from the requesting device or another requesting device external from the first memory node.

7. A method as defined in claim 5, wherein the node-to-node copy request is an automatic event generated at the first memory node without intervention from an external device.

8. An apparatus to store data in a networked memory organization, comprising:
a plurality of dynamic random access memory modules; and
network interfaces on the dynamic random access memory modules to communicatively couple the dynamic random access memory modules, and to communicatively couple at least some of the dynamic random access memory modules to a processor to allow the processor to access data stored in any of the dynamic random access memory modules; and logic circuits on respective ones of the dynamic random access memory modules to generate parity information to store in a distributed arrangement across the plurality of dynamic random access memory modules.

9. An apparatus as defined in claim 8, wherein the data and the parity is stored across the dynamic random access memory modules in a striped arrangement.

10. An apparatus as defined in claim 8, wherein the dynamic random access memory modules are mounted on a single printed circuit board.

11. An apparatus to read data comprising:

a processor; and a plurality of memory nodes in communication with the processor and with one another, the processor to send a request for data to a first one of the memory nodes, the data stored in a distributed configuration in at least the first memory node and a second one of the memory nodes, the first memory node to retrieve a first portion of the data from a first memory location of the first memory node, the second memory node to retrieve a second portion of the data from a second memory location of the second memory node, and the second memory node to send the first and second portions of the data to the processor.

12. An apparatus as defined in claim 11, wherein the first and second memory nodes are solid state memory modules comprising at least one of dynamic random access memory or non-volatile memory.

13. An apparatus as defined in claim 11, wherein the first and second memory nodes are mounted on a single printed circuit board.

14. An apparatus as defined in claim 11, wherein the second memory node is to retrieve the second portion of the data after receiving the first portion of the data at the second memory node from the first memory node.

15. An apparatus as defined in claim 11, wherein the second memory node is to retrieve the second portion of the data without receiving a request for the second portion of the data directly from the processor.

\* \* \* \* \*